United States Patent [19]
Larson et al.

[11] Patent Number: 5,651,861
[45] Date of Patent: Jul. 29, 1997

[54] PROCESS FOR REMOVING INKS FROM WASTE PAPER

[75] Inventors: Eric Heath Larson, Freehold, N.J.; Marie Odile Lafon, Paris, France

[73] Assignee: Rhone-Poulenc Inc., Cranbury, N.J.

[21] Appl. No.: 573,710

[22] Filed: Dec. 18, 1995

[51] Int. Cl.$^6$ .................................................. D21C 5/02
[52] U.S. Cl. ........................................................ 162/5
[58] Field of Search ................................ 162/5, 4, 6, 7, 162/8; 210/734, 727, 723

[56] References Cited

U.S. PATENT DOCUMENTS

| | | | |
|---|---|---|---|
| Re. 28,474 | 7/1975 | Anderson et al. | 523/336 |
| 507,924 | 5/1893 | Reed et al. | 210/734 |
| 4,618,400 | 10/1986 | Wood et al. | 162/5 |
| 4,666,558 | 5/1987 | Wood et al. | 162/5 |
| 5,013,456 | 5/1991 | St. John et al. | 210/734 |
| 5,221,433 | 6/1993 | Daute et al. | 162/5 |
| 5,223,089 | 6/1993 | Kato | 162/5 |
| 5,225,046 | 7/1993 | Borchardt et al. | 162/5 |
| 5,227,019 | 7/1993 | Borchardt | 162/6 |
| 5,231,022 | 7/1993 | Saito et al. | 435/209 |
| 5,258,099 | 11/1993 | Borchardt | 162/5 |
| 5,269,942 | 12/1993 | Harrington, IV et al. | 210/727 |
| 5,302,243 | 4/1994 | Ishibashi et al. | 162/5 |
| 5,387,318 | 2/1995 | Liao et al. | 162/5 |
| 5,417,808 | 5/1995 | Okamoto et al. | 162/5 |
| 5,442,082 | 8/1995 | Uphues et al. | 554/149 |

FOREIGN PATENT DOCUMENTS

| | | | |
|---|---|---|---|
| 2135694 | 6/1995 | Canada | 162/5 |

*Primary Examiner*—Donald E. Czaja
*Assistant Examiner*—Jose A. Fortuna
*Attorney, Agent, or Firm*—Andrew M. Solomon

[57] ABSTRACT

A process for removing oil-based inks and/or waterborne inks under slightly acidic, neutral or alkaline conditions by using either a flotation technique and/or a washing technique by using a novel deinking agent having a quaternized nitrogen group is provided.

23 Claims, No Drawings

PROCESS FOR REMOVING INKS FROM WASTE PAPER

BACKGROUND OF THE INVENTION

1. Field of the Invention

The present invention relates to a process for removing inks from waste paper. More particularly, the invention relates to a process for deinking waste paper comprising the steps of converting waste paper to a pulp, contacting the pulp with a deinking agent comprising an aqueous dispersion of a surface-active copolymer bearing quaternized nitrogen atoms and removing ink from the pulp.

2. Technology Description

Waste paper has long served as a source of raw fiber material for paper making for the production of a variety of paper and paperboard products. Today, greater utilization of reclaimed fiber has provided incentive for taking steps to upgrade the reclaimed product. These processes include steps to effectively remove ink from waste fibers in order to permit their use in the manufacture of, for example, newsprint and hygiene paper and high quality papers.

Therefore, efficient ink removal is particularly desirable to obtain excellent quality, high value products.

In the course of conventional paper reclamation, the deinking processes essentially comprise the following steps:

1) pulping the waste paper, i.e. fiberizing it in water
2) contacting the pulp with an alkaline aqueous deinking medium containing a chemical deinking agent.

The physical pulping and the alkalinity of the aqueous medium cause at least the partial removal of ink from the pulp fiber. The deinking agent completes this removal and produces an aqueous suspension and/or dispersion of the ink particles.

3) Removing the detached suspended dispersed ink from the pulp. This separation can be carried out by washing and/or flotation techniques well know in the art.

Steps (1) and (2) can be performed at least partly at the same time.

There are basically two main different kind of inks:

- Conventional inks or oil-based inks are based on organic solvents, mineral oils, hydrocarbons and nitrocellulose. Suitable solvents are for example esters/or ketones, for example ethyl acetate, methyl ethyl ketone and alcohol and organic resins. These conventional inks are most of the time well detached from the fibers during pulping in an alkaline medium and well removed during a subsequent flotation step with an appropriate deinking agent.
- Waterborne inks mainly used in flexographic printing of newspapers have been developing over several years.

The reason for the increased use of waterborne printed inks are environmentaly based. There are also safety and economic reasons for using them. Waterborne inks are non-flammable which eliminates the need for expensive safety systems which have to be installed in plants where oil-based inks are used. In addition to that, waterborne inks have the further advantages of reducing pproblems during start-up of the printing machine and increase the possibility of utilization of lower basis weight papers.

However, waterborne inks, more particularly in waterborne flexographic printed newspapers, lead to great deinking difficulties which can make flotation de-inking plants inefficient.

Another difficulty is to pulp a batch of reclaimed paper without any flexographic printed newspaper in it. In fact most of the time the reclaimed waste papers are mixed together and it is impossible or at least uneconomical to separate the two different inks. Or the impact of using some waterborne inks on conventional deinking processes is severe; inclusion of as little as 5% flexographic newspapers into a newsprint recycle furnish, can significantly reduce the brightness of the recycled pulp.

Conventional practice has been to process flexographic newsprint using wash deinking processes. While wash deinking is easy to operate, and requires minimal capital investment, the large volumes of water required make wash deinking an increasingly environmentally unacceptable practice. The paper industry as a whole is under severe pressure to reduce rates of water consumption. As a result the trend in the recycled paper industry is towards use of flotation or hybrid flotation/wash systems for ink removal. Flotation is particularly ill-suited for removal of waterborne ink from recycle newsprint as both the small particle size and hydrophilic nature of the ink result in poor rates of bubble attachment and low separation efficiencies. The poor effectiveness of flotation in removal of waterborne inks is a particular obstacle to recycling newsprint so contaminated, and in some cases restricts the acceptance of the use of waterborne inks as a means to reduce emissions of volatile organic compounds.

There have been proposals describing a two stage process to remove waterborne pigments using a flotation step under acidic conditions followed by a flotation step under alkaline conditions. Maintenance of acid conditions limits the hydrophilicity of the pigment particles, and reduces the degree of dispersion of such inks. The benefit of this procedure is avoidance of the high water consumption of a wash system, however the capital and operating costs of this process are greater than that of a single flotation stage process, and in addition pulping under acidic conditions is difficult if the waste paper contains alkaline fillers such as calcium carbonate.

In Borchardt et al (TAPPI 1994 Pulping Conference, November 6–10, Proceedings pages 1067–1103) many of the difficulties of recycling flexographic newsprint are described in detail; in particular the extremely small size and hydrophilic nature of the pigment particles, and difficulty in removing them by either wash or flotation unit operations. Borchardt also discloses polyacrylates as effective in reducing redepositon of pigment in these applications.

In WO 93/21376 the use of anionic polymers as aides in deinking wastepaper under substantially neutral conditions is described. This reference stresses that its process cannot be used at a pH of greater than 9 as yellowing of the pulped fibers can occur.

U.S. Pat. No. 5,094,716 describes the use of a combination of an anionic surfactant and an anionic dispersant for use in removal of hydrophobic inks in wash processes. This reference does not suggest the use of its process for treatment of hydrophilic inks or the use of a nonionic surfactant.

U.S. Pat. No. 4,599,190 describes the use of polyelectrolyte dispersants in combination with nonionic surfactants in wash deinking of secondary fiber. This process suggested is not a flotation process and it is unclear from the teaching of the reference if it can be used to treat hydrophilic inks.

Canadian patent 2,003,406 relates to a composition for deinking wastepaper comprising an at least partly water soluble polymer.

Despite the above teachings their still exists a need in the art for a process for removing oil-based inks and/or waterborne inks under slightly acidic, neutral or alkaline conditions by using either a flotation technique and/or a washing technique by using a novel deinking agent.

BRIEF SUMMARY OF THE INVENTION

In accordance with the present invention a novel process for deinking wastepaper is provided which reveals a surprising combination of beneficial effects under the conditions of slightly acidic, neutral or alkaline treatment and which can be efficient either on waterborne inks and/or on oil-based inks.

All percentages and ratios given are on a weight basis unless otherwise indicated.

One of the embodiment of the present invention provides a process for deinking wastepaper comprising the steps of:

(1) converting wastepaper to a pulp,
(2) contacting the pulp with a deinking agent comprising an aqueous dispersion of a surface active copolymer of:
   (A) from about 0.1–99.5, more preferably from about 5–95, most preferably from about 20–95 weight percent based on total weight monomers of at least one vinyl monomer having at least one quarternized nitrogen atom;
   (B) from about 0–95, more preferably from about 0–70, most preferably from about 0–60 weight percent based on the total weight of the monomers, of at least one vinyl monomer having at least one amide group;
   (C) from about 0.5–75, more preferably from about 5–50, most preferably from about 1–50 weight percent based on the total weight of the monomers, of at least one vinyl monomer bearing both an hydrophobic and an hydrophilic group,
   (D) from about 0–10, more preferably from about 0–5 weight percent, based on the total weight of the monomers, of at least one vinyl monomer bearing at least one carboxylic group, and
(3) removing ink from the pulp;
with the proviso that the sum of the percentages of monomers (A) to (D) is 100.

The ammonium monomers (A) are preferably of the formula:

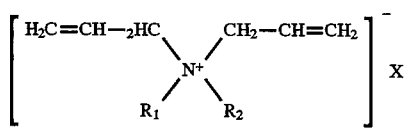

in which $R_1$ and $R_2$, identical or different are $C_1$–$C_6$ alkyl such as methyl, ethyl, propyl and hexyl. More preferably $R_1$ is the same as $R_2$ and is methyl or ethyl. Generally speaking the counter ion $(X)^-$ of the ammonium atom is any mineral and/or organic anion, such as chloride or sulfate.

These preferred monomers are dimethyldiallylammonium chloride or sulfate and diethyldiallylammonium chloride or sulfate.

Others preferred monomers (A) are selected from the group consisting of: (meth)acryloyloxyethyltrialkylammonium (chloride or methylsulfate), (meth)acryloyloxyhydroxypropyltrialkylammonium (chloride or methylsulfate), (meth)acrylamidopropyltrialkylammonium (chloride or methylsulfate).

It is also possible to use a precursor of monomer (A). This precursor can be a vinyl monomer having a nitrogen atom which can be subsequently quarternized during or after the polymerization. These precursors can be selected from the group comprising

- vinyl pyridine or vinyl amines such as (meth) acryloyloxyethyltrialkylamine, (meth) acryloyloxyhydroxypropyltrialkylamine modified with glycidyltrialkylammonium chloride,
- vinyl amides such as (meth)acrylamide including N-substituted analogs thereof modified through the Mannich reaction, either pre or post polymerization, which can be subsequently quarternized with methyl chloride, benzyl chloride or dimethyl sulfate,
- (meth)acrylic acid modified with glycidyltrialkylammonium chloride during pre or post polymerization,
- vinyl formamide hydrolyzed during pre- or postpolymerization, and the inorganic salt or quarternized derivatives thereof.

Other monomers containing amino or quaternary amino groups are disclosed in U.S. Pat. No. 3,766,156 the disclosure of which is incorporated herein by reference.

Suitable monomers (B) are for example of the formula:

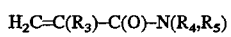

in which $R_3$ is H or $C_1$–$C_6$ alkyl, $R_4$ and $R_5$, which can be identical or different are H or $C_1$–$C_{12}$ hydrocarbon radical such as alkyl, aryl, alkylaryl or arylalkyl. Examples of alkyl groups are methyl, ethyl, propyl, ethyl-2 hexyl and dodecyl, examples of aryl groups are phenyl and naphthyl, examples of alkyl aryl groups are methylphenyl, ethylphenyl, examples of arylalkyl groups are phenyl methyl and phenylalkyl.

Examples of suitable monomer (B) are (meth)acrylamide or an alkyl or dialkyl N-substituted (meth)acrylamide and N-(dimethylaminoethyl) acrylamide. It is possible to use a part of the monomer (B), as a precursor for at least a part of the monomer (A) for example by quarternizing (B), before or after polymerization with a quarternizing agent such as methyl chloride as indicated above.

The copolymer also comprises from about 0.5–40 of monomer (C), more preferably, from about 1–40, most preferably from about 10–30 weight percent of at least one vinyl monomer bearing both an hydrophobic and an hydrophilic group, based on the total weight of the monomers. More particularly monomers (C) can be of the formula:

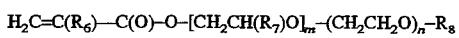

wherein $R_6$ is H or $C_1$–$C_6$ alkyl group, preferably H or methyl; $R_7$ is $C_1$–$C_4$ alkyl, preferably methyl; n is an average number from about 6–100, preferably 10–40 and m is an average number from about 0–50, preferably 0–10, provided that n is superior or equal to m and sum of (n+m) is about 6–100; $R_8$ is a hydrophobic $C_8$–$C_{40}$ linear or branched alkyl, alkylaryl, or arylalkyl group, preferably a $C_{18}$–$C_{30}$ alkyl, more preferably a $C_{22}$ behenyl radical or a tristyrylphenyl group of the formula:

wherein x is an average number of from about 2 to about 3, wherein the substituent denoted x is randomly distributed around the benzene ring to which it is linked.

The above monomer can be obtained by the reaction of a vinyl monomer of an ester of (meth)acrylic acid with an alkoxylated alcohol or alkoxylated polystyryl phenol or by any other known process.

The vinyl monomer of the formula:

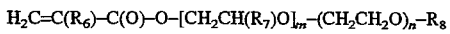

in which $R_6$, $R_7$, $R_8$, m and n have the meaning indicated above for the formula of monomer (C). These are described in detail in European Patents EP 011,806, EP 013,836 and in U.S. patent application Ser. No. 08/317,261, filed Oct. 3, 1994, the disclosures of which are incorporated herein by reference.

The copolymer can also comprises for some purposes from 0 to about 10 weight percent of at least one vinyl monomer (D) bearing at least one carboxylic group, more particularly of the formula:

$$R_9CH=C(R_{10})COOH$$

in which $R_9$ is H, C(O)OY or $CH_3$, wherein when $R_9$ is H, $R_{10}$ is H, $C_1-C_4$ alkyl, or $CH_2$ COOY; when $R_9$ is COOY, $R_{10}$ is H or $CH_2COOY$; or when $R_9$ is $CH_3$, $R_{10}$ is H; Y is H or $C_1-C_4$ alkyl.

Among these monomers, acrylic or methacrylic acid or a mixture thereof with itaconic or fumaric acid are preferred, but crotonic and itaconic acid and half esters of these and other polycarboxylic acids such as maleic acid with $C_1-C_4$ alkanols are also suitable, particularly if used in minor amount in combination with acrylic or methacrylic acid. For most purposes, it is preferable to have at least about 0.5 weight percent and most preferably from about 1–5 weight percent of the carboxylic acid monomer.

The copolymer can be a statistical block or sequenced polymer. Most of the time it is a statistical copolymer.

In a preferred embodiment of the present invention the relative quantity of monomers (A), (B), (C) and optionally (D) are chosen in order to provide a surface active polymer dispersion with a molecular weight $M_w$ between about 5,000 and about 5,000,000 more preferably between about 10,000 and about 2,000,000 daltons.

The term "vinyl monomer" as used herein means a monomer comprising at least one of the following groups:

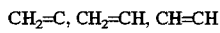

$$CH_2=C, CH_2=CH, CH=CH$$

Polymerization of Copolymer

The liquid dispersion copolymers of the invention can be conveniently prepared from the above-described monomers by conventional polymerization techniques in water at a pH lower than about 9.0 but greater than 3, preferably about 7 using free-radical producing initiators, usually in an amount from 0.01 percent to 3 percent based on the weight of the monomers. The free-radical producing initiators conveniently are peroxygen compounds especially inorganic persulfate compounds such as ammonium persulfate, potassium persulfate, sodium persulfate; peroxides such as hydrogen peroxide; organic hydroperoxides, for example, cumene hydroperoxide, t-butyl hydroperoxide; organic peroxides, for example, benzoyl peroxide, acetyl peroxide, lauroyl peroxide, peracetic acid, and perbenzoic acid (sometimes activated by a water-soluble reducing agent such as ferrous compound or sodium bisulfite). These initiators are preferably water soluble such as:

2,2'azobis (N,N'-dimethyleneisobutyramidine) dihydrochloride 2,2'azobis (2-amidino-propane) dihydrochloride 2,2'azobis (N,N'-dimethyleneisobutyramidine)

Optionally a chain transfer agent can be used. Representative chain transfer agents include carbon tetrachloride, bromoform, bromotrichloromethane, long chain alkyl mercaptans and thioesters such as n-dodecyl mercaptan, t-dodecyl mercaptan, octyl mercaptan, tetradecyl mercaptan, hexadecyl mercaptan, butyl thioglycolate, isooctyl thioglycolate, and dodecyl thioglycolate. The chain transfer agents can be used in amounts up to about 10 parts per 100 parts of polymerizable monomers.

Optionally, other ingredients well known in the aqueous polymerization art may be included such as chelating agents, buffering agents, surfactants, inorganic salts and pH adjusting agents. The use of surfactants during the polymerization process is for example described in "Progress in Organic Coatings 24 (1994) 11–19", the disclosure of which is incorporated herein by reference.

Usually the copolymerization is carried out at a temperature between about 80° C. and 100° C. but higher or lower temperatures including polymerization under vacuum or pressure can be used. The polymerization can be carried out batchwise, stepwise or continuously with batch and/or continuous addition of the monomers in a conventional manner.

The monomers can be copolymerized in such proportions, and the resulting dispersion polymers can be physically blended, to give products with the desired balance of properties. Minor quantities of a polyfunctional monomer, such as itaconic or fumaric acid to introduce a higher carboxylic acid content or limited crosslinking, provides further control of the structure of the polymer. Thus, by varying the monomers and their proportions, copolymers having optimum deinking properties can be designed. Particularly effective liquid dispersion copolymers can be obtained by copolymerization of about 0.1–95, more preferably 5–70, most preferably 1–20 weight percent of monomer (A), about 0.1–95, more preferably 10–70, most preferably 20–60 weight percent of monomer (B), about 0.5–40, more preferably 1–40, most preferably 10–30 weight percent of monomer (C) and about 0–10, more preferably 0–5 weight percent of optional monomer(D), all percentages being based on the total weight of the monomers.

The amount of surface active copolymer (calculated as dry) present in the aqueous medium of the pulper ranges from about 0.01 to about 5.0 percent by weight based upon the dry weight of all paper added to the pulper, with amounts ranging from about 0.1 to about 2 percent being more preferred.

Waste paper Treatment

The paper to be pulped, which also includes by definition any cellulosic sheet materials containing hydrophilic flexographic inks (hydrophilic inks) and/or oil-based inks (hydrophobic inks) including, for example, newspaper, filled and unfilled papers and paper boards is provided to a pulper at alkaline pH conditions. Therefore the ink present on the paper to be pulped comprises waterborne flexographic ink and/or oil-based ink.

Surprisingly it has been discovered that the deinking agent according to the present invention is suitable for use in a medium having a pH of from slightly acidic (about 4 to 6), neutral (about 6 to 8 ) or alkaline (about 8 to 10.5). A neutral or an alkaline pH is preferred.

The pH of the aqueous medium of the pulper can be preferably maintained between about 8 to about 10.5, more preferably between about 9 to about 10, and most preferably between about 9 to about 9.5. This alkaline pH range is particularly useful with paper containing more than about 50% of oil-based inks. Maintenance of the alkaline pH is accomplished by adding one or more basic agents to the pulper. Agents which may be selected include any of those commonly known in the art which are capable of raising the pH to between 8.0 and about 10.5. Examples of such basic agents include, but are not limited to the following materials: of NaOH, $NH_4OH$, KOH, $Na_2CO_3$, $K_2CO_3$, silicates ($Na_2O$ $(SiO_2)_x$ x=0.4 to 4.0, $Na_3PO_4$, $Na_2HPO_4$ and mixtures thereof. The amount of basic agent added to the pulper is that which is required to obtain the desired pH. This amount can be readily measured by those skilled in the art.

According to one preferred embodiment of the invention one or more nonionic surfactants can be further added in the aqueous medium of the pulper more particularly when more than 50% of the ink is oil-based ink. The surfactants function is to disperse the ink into the aqueous medium during pulping. Nonionic surfactants suitable for use are higher (greater than $C_8$) aliphatic alcohol alkoxylates, aliphatic acid alkoxylates, higher aromatic alcohol alkoxylates, fatty acid amides of alkanolamines, fatty acid amide alkoxylates, propylene glycol alkoxylates, block or random copolymers of ethylene and propylene oxide, higher (greater than $C_8$) alcohol polyethylene polypropylene block or random adducts and mixtures thereof. Specific examples of surfactants which may be used in accordance with the present invention include the following classes of chemicals:

1) a fatty alcohol having a carbon number of from about 8 to about 22, alkoxylated with ethylene oxide and propylene oxide, as represented by formula (I)

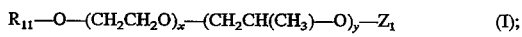

wherein $R_{11}$ is a straight-chain or branched alkyl group having a carbon number of from about 8 to 22; $Z_1$ is H or Cl; x represents the number of oxyethylene groups per molecule and is in the range of from about 3 to about 25; and y represents the number of oxypropylene groups per molecule and is in the range of from about 1 to about 10. Examples of commercially available products are sold under the InkMaster™ and Antarox® trademarks by Rhône-Poulenc Inc.;

2) a fatty alcohol having a carbon number of from about 8 to about 22, alkoxylated with ethylene oxide and propylene oxide, as represented by formula (II):

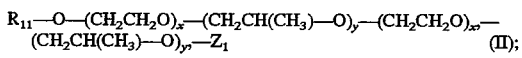

wherein $R_{11}$ is a straight-chain or branched alkyl group having a carbon number of from about 8 to about 22; $Z_1$ is H or Cl; x and x', which may be the same or different, represents the number of oxyethylene groups per molecule and is in the range of from about 2 to about 25; and y and y', which may be the same or different represents the number of oxypropylene groups per molecule and is in the range of from 0 to about 10 Examples of commercially available products are sold under the InkMaster™ trademark by Rhône-Poulenc Inc.;

3) a fatty acid having a carbon number of from about 8 to about 22, alkoxylated with ethylene oxide and propylene oxide, as represented by formula (III):

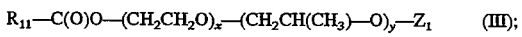

wherein $R_{11}$ is a straight-chain or branched alkyl group having a carbon number of from about 8 to about 22; $Z_1$ is H or Cl; x represents the number of oxyethylene groups per molecule and is in the range of from about 3 to about 25; and y represents the number of oxypropylene groups per molecule and is in the range of from about 2 to about 15. Examples of commercially available products are Lionsurf®, Nonatell®, Hipochem®, and Berocell® products sold respectively by Lion Industries, Inc., Shell Oil Company, High Point Chemical Corp. and EKA Nobel AB;

4) an aromatic alcohol such as phenol having alkyl chain(s) with a carbon number of from about 8 to about 20, alkoxylated with ethylene oxide, as represented by formula (IV):

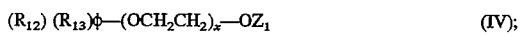

wherein φ is a phenyl ring, $R_{12}$ and $R_{13}$ independently are H or an alkyl group which is branched or straight-chain having a carbon number of from about 8 to about 14; $Z_1$ is H or Cl; and x is the number of oxyethylene groups per molecule and is in the range of from about 1 to about 20. Examples of commercially available products are InkMaster™, Igepal®, and Alkasurf®, products sold by Rhône-Poulenc Inc.;

5) fatty amide of alkanolamide of formula (V):

wherein R' and R" may be the same or different and are H or $CH_2CH_2OH$ or $CH_2CH(CH_3)$—OH and $R_{11}$ is a fatty alkyl group having a carbon number of from about 8 to about 20. Examples of commercially available products are Alkamide® products sold by Rhône-Poulenc Inc.;

6) an alkoxylated fatty acid amide of alkanolamide of formula (VI):

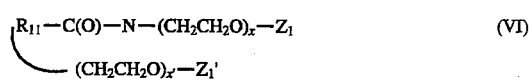

wherein $R_{11}$ is a fatty alkyl group having a carbon number of from about 8 to about 20; $Z_1$ and $Z_1'$, which may be the same or different are H or Cl; and x and x', which may be the same or different, represents the number of oxyethylene groups per molecule and is in the range of from about 2 to about 10. Examples of commercially available products are Alkamide® products sold by Rhône-Poulenc Inc.;

7) a propylene glycol alkoxylate of formula (VII):

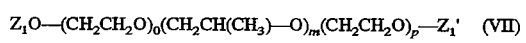

wherein $Z_1$ and $Z_1'$, which may be the same or different are H or Cl; o and p are the number of oxyethylene groups per molecule and are in the range of from about 3 to about 15 and m is the number of oxypropylene groups per molecule and is in the range of from about 2 to about 40 Examples of commercially available products are Antarox® products sold by Rhône-Poulenc Inc. and products having a CTFA designation of Poloxamer;

8) a block or random copolymer of ethylene and propylene oxide of formula (VIII):

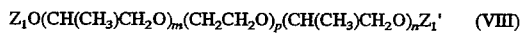

wherein $Z_1$ and $Z_1'$, which may be the same or different are H or Cl; m and n are the number of oxypropylene groups per molecule and are in the range of from about 10 to about 25 and p is the number of oxyethylene groups per molecule and is in the range of from about 5 to about 25. Examples of commercially available products are Antarox® products sold by Rhône-Poulenc Inc. and products having a CTFA designation of Meroxopol;

9) an ethoxylated fatty acid glycol and/or polyethylene glycol esters of formula (IX):

wherein $R_{15}$ is a fatty alkyl group of greater than $C_8$; $R_{16}$ is alkyl of greater than $C_8$ or H; and x represents the number of oxyethylene groups per molecule and is in the range of from about 5 to about 200. Examples of commercially available products are Alkamus® products sold by Rhône-Poulenc Inc. and products having a PEG castor oil CTFA designation; and 10) an ethoxylated fatty alcohol of formula (X):

$$R_{15}O(CH_2CH_2O)_x-Z_1 \qquad (X)$$

wherein $R_{15}$ is a fatty alkyl group; $Z_1$ is H or Cl; and x represents the number of oxyethylene groups per molecule and is in the range of from about 1 to about 20 Examples of commercially available products are Rhodasurf® products sold by Rhône-Poulenc Inc.

More preferred nonionic surfactants within the above classes include:

1) Those of Formula (I) wherein $R_{11}$ is a straight-chain or branched alkyl group having a carbon number of from about 16 to 20, $Z_1$ is H, x represents the number of oxyethylene groups per molecule and is in the range of from about 10 to about 20, and y represents the number of oxypropylene groups per molecule and is in the range of from about 4 to about 8. A commercial example of such a nonionic surfactant is InkMaster™ 750; or wherein $R_{11}$ is a straight-chain or branched alkyl group having a carbon number of from about 8 to 14, $Z_1$ is H, x represents the number of oxyethylene groups per molecule and is in the range of from about 3 to about 12, and y represents the number of oxypropylene groups per molecule and is in the range of from about 1 to about 6. A commercial example of such a nonionic surfactant is Antarox® LA-EP-16, sold by Rhône-Poulenc.;

2) Those of Formula (II) wherein $R_{11}$ is a straight-chain or branched alkyl group having a carbon number of from about 16 to about 20, $Z_1$ is H, x and x' represents the number of oxyethylene groups per molecule and is in the range of from about 4 to about 10, and y and y' represents the number of oxypropylene groups per molecule and is in the range of from about 1 to about 5;

3) Those of Formula (III) wherein $R_{11}$ is a straight-chain or branched alkyl group having a carbon number of from about 12 to about 18, $Z_1$ is H, x represents the number of oxyethylene groups per molecule and is in the range of from about 3 to about 25, and y represents the number of oxypropylene groups per molecule and is in the range of from about 2 to about 15. A commercial example of such a nonionic surfactant is Hipochem® DI600, sold by High Point Chemicals;

4) Those of Formula (IV) wherein $R_{12}$ and $R_{13}$ is H or a branched or straight-chain having a carbon number of from about 8 to about 14, $Z_1$ is H, and x is the number of oxyethylene groups per molecule and is in the range of from about 8 to about 12. A commercial example of such a nonionic surfactant is InkMaster™ 730;

5) Those of Formula (V) wherein R' and R" are H or $CH_2CH_2OH$ or $CH_2CH(CH_3)-OH$ and $R_{11}$ is a fatty alkyl group having a carbon number of from about 8 to about 14;

6) Those of Formula (VI) wherein $R_{11}$ is a fatty alkyl group having a carbon number of from about 8 to about 14, $Z_1$ is H, and x and x' represents the number of oxyethylene groups per molecule and is in the range of from about 4 to about 8;

7) Those of Formula (IX) wherein $R_{15}$ is a fatty alkyl group of greater than $C_8$; $R_{16}$ is alkyl of greater than $C_8$ or H; and x represents the number of oxyethylene groups per molecule and is in the range of from about 8 to about 30; and 8) Those of Formula (X) wherein $R_{15}$ is a fatty alkyl group having a carbon number from about 12 to about 18, $Z_1$ is H, and x represents the number of oxyethylene groups per molecule and is in the range of from about 5 to about 15. A commercial example of such a nonionic surfactant is Rhodasurf® BC720, sold by Rhône-Poulenc Inc.;

Of the above, the use of the following classes of nonionic surfactants is particularly suggested: those of Formula (I), (II), (IX) as defined above.

Other nonionic surfactants include alkyl polyglycosides, N-octyl pyrollidones and ethoxylated tristyrylphenols.

The amount of surfactant present in the aqueous medium of the pulper ranges from about 0.01 to about 5.0 percent by weight based upon the dry weight of all paper added to the pulper, with amounts ranging from about 0.05 to about 0.5 percent being more preferred and amounts ranging from about 0.05 to about 0.4 percent being even more preferred.

Also optionally present in the aqueous medium of the pulper may be one or more anionic polyelectrolytes. Such materials are characterized by being anionic in nature and function to reduce redeposition of the carbon black pigment to the pulp fibers. Optionally present in the aqueous medium of the pulper are commonly known deinking additives added in amounts recognized by those skilled in the art. Such additives include, but are not limited to bleaches, sodium silicate, chelants, sequestrants, dispersants other than the defined nonionic surfactant, coagulants, detergent builders, other detergents and the like. In addition, the pulper may also include an amount of newsprint printed with a hydrophobic ink.

It is important to maintain an appropriate pulp slurry temperature during pulping. Determining the appropriate temperature range is within the skill of an artisan. Generally the range is from about 30° C. to about 65° C., preferably from about 35° C. to about 60° C. and most preferably from about 40° C. to about 55° C. Once the paper added to the pulper has been sufficiently slurried in the aqueous medium, the slurry is transferred to a flotation cell. As is defined for the pulping, the flotation cell can be maintained with a pH of from slightly acidic (about 4 to 6), neutral (about 6 to 8) or alkaline (about 8 to 10.5). A neutral or an alkaline pH is preferred.

The pH often is the pH of the slurry which is provided to the flotation cell. If necessary to provide the desired pH profile, one or more of the basic agents, acidic agents or buffered agents can be added in amounts to yield a pH in the flotation cell as defined above.

The slurry is maintained in the flotation cell for a time, temperature and rate of agitation necessary to produce a foam which contains a significant amount of the removed ink. Such process conditions are preferably those operating conditions which are defined by the manufacturer of the flotation cell. Such conditions typically comprise treating the slurry at about 40° C. to about 50° C. for about 1 to about 30 minutes, injecting air into the cell in an amount sufficient to disperse air bubbles throughout the mixture, with good agitation and without becoming so turbulent as to dislodge ink from the air bubbles. This amount of injection is typically about 1 cell volume of air per minute. The concentration of the paper fibers is about 0.5 to about 2.0% of the cell.

Once flotation has been completed, the foam which forms above the slurry in the flotation is removed by methods known in the art such as by a scraper. From the remaining slurry, paper can be produced which has a high level of brightness.

Alternatively, the remaining slurry may be subjected to additional processing steps such as post flotation wash procedures as would be recognized by those skilled in the art to yield even more superior paper products.

The deinking agent of the present invention comprising the dispersion of the surface active copolymer and preferably the nonionic surfactant can be added in the water into which the wastepaper is initially pulped; into the aqueous pulp produced after the wastepaper is pulped; or during the flotation and/or washing step. Preferably the deinking agent is incorporated after the wastepaper has been pulped, i.e. during the flotation step.

The invention is further described in greater detail by the following non-limiting examples.

EXAMPLE 1

A) Polymerization of a Surface Active DMDAAC/SEM/Acrylamide Copolymer ($P_1$): A reactor comprising a 1 liter electrically heated resin flask with a four neck top was utilized. A condenser using tap water as the cooling medium was fitted to one neck; the agitator shaft entered through the central neck, sealed through a Teflon fitting and a O-ring lubricated with silicone grease; monomer was fed through a stainless steel tube inserted in a rubber stopper in the third neck; a temperature probe, initiator feed and $N_2$ were fed through tubing in a rubber stopper in the fourth neck. The condenser discharge was bubbled through water to maintain a positive pressure in the reactor. Agitation was provided by a stainless steel 5.2 millimeter diameter Lightnin' high efficiency axial flow turbine set near the bottom of the flask, operating at 500 RPM. Temperature was controlled via a temperature sensor connected to a three mode controller using time-proportioning to modulate the electrical heating of the reactor. Monomer was fed into the reactor using a positive displacement pump over a two hour period. Initiator solution was fed into the reactor using a separate positive displacement pump over the same two hour period. Nitrogen was sparged into the reactor mass at a rate sufficient to maintain a positive pressure of about 1 Hg centimeter. For most reactions this corresponded to a flow rate of about 0.75 liter/min at 3 bars.

Initially, the reactor charge (RC) had the following composition: 0.16 gm ammonium persulfate, 0.019 gm Versenex 80 (40% diethylentriamine pentaacetic acid or (DTPA) solution) and 200 gm of deionized water were introduced into the reactor and thereafter the monomer feed and the initiator feed were introduced into the reactor.

The monomer feed (MF) had the following composition:

14.64 gm of tristyrylphenol polyethoxylate (40 EO) methacrylic ester (SEM) having the formula:

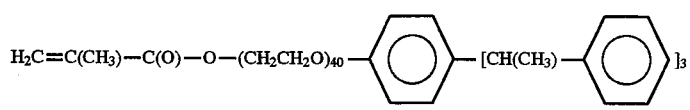

81.5 gm of a 53% aqueous acrylamide solution, 68.42 gm of 62% aqueous solution of dimethyldiallylammonium chloride (DMDAAC) and, 84.22 gm of deionized water and 0.61 gm of MAA (methacrylic acid).

The initiator feed (IF) had the following composition:

50 gm of deionized water 1.08 gm of ammonium persulfate, 60 ml of deionized water, and one drop of 15% aqueous NaOH by weight).

The reaction was performed at pH about 7 and at a temperature of 90° C. The reaction mass was held at 90° C. after completion of feed of initiator and monomer for 30 minutes. The copolymer obtained was called ($P_1$).

B) Evaluation of Resulting Copolymer ($P_1$):

The evaluation procedure used was as follows:

(1) FONP stands for water based flexographic old printed newsprint. The FONP was Knoxville News-Sentinel. ONP stands for old newspaper. The ONP was New York Times. OMG stands for old magazines. A 30% FONP/40% ONP/30% OMG mixture of wastepaper was used.

(2) OMG was previously pulped at about 3.6% consistency in a Waring® laboratory blender for 2 minutes without chemicals at 45° C. at a pH of about 9.5. This pulp was then added to the FONP and ONP in a Kitchen Aid® mixer with a temperature bath and blended for 5 minutes at an intermediate speed setting. 1% hydrogen peroxide (50%), sodium silicate (PQ Corp. Type N), NaOH (0.9%) were added to the pulper. Percentages are on a dry fiber basis. 0.1% of Rhoditek 1000 was also added. Rhoditek 1000 is a C16–20 ethoxylated (20 EO)-propoxylated (8PO) surfactant.

(3) The resulting pulp was diluted to 1% consistency.

(4) The pulp was then submitted to flotation in a Denver Cell (5 L capacity, 3 liter/min air injection, 3 min flotation time, 2100 rpm) with reject collection and polymer P was added. The pH was about 9.2.

(5) Flotation accepts were diluted to 0.5% consistency and a filter pad was prepared by filtration through crepe filter paper under vacuum. The filtrate turbidity was measured using a Hach Ratio® XR turbidimeter.

(6) The filter paper was stripped from the filter pad; the pad was pressed and dried overnight according to TAPPI standard method 204. The pad was then cut into 7 equal wedges, stacked and brightness measurements taken of each segment, top and bottom using a Technidyne Handibright calibrated using white and yellow ceramic standards supplied by the equipment manufacturer.

The following results were obtained and are gathered in Table 1 herein after:

| Polymer Solution Dose (gm)* | Top Brightness | Bottom Brightness | Filtrate Turbidity NTU | Rejects (gm) |
|---|---|---|---|---|
| 2 | 49.1 | 48.2 | 65 | 1033 |
| 1 | 49.1 | 47.8 | 166 | 974 |

*Polymer concentration of the polymer solution is 20% by weight.

EXAMPLE 2

A) Polymerization of copolymer ($P_2$).

The same process as in Example 1 was performed except that the compositions of (MF), (IF) and (RC) were as follows:

Monomer Feed (MF):

lauryl methacrylate 3.89 grams

DMDAAC 62% aqueous solution 77.58 grams

Acrylamide 91.68 (53% aqueous solution) grams

Water 76.86 grams

Initiator Feed (IF):

0.216 gm Ammonium persulfate 60 gm water 1 drop 15% NaOH

Reactor Charge (RC):

0.032 gm Ammonium persulfate 250 gm water 0.0168 gm Versenex 80

The polymer obtained was called ($P_2$).

B) Evaluation of resulting Polymer ($P_2$).

The same flotation process as in Example 1 was performed except that ($P_2$) was used instead of ($P_1$) and except that no Rhoditek 1000 surfactant was used. The following results were obtained and are gathered in Table 2 herein after:

| Polymer Solution Dose (gm)* | Top Brightness | Bottom Brightness | Filtrate Turbidity NTU | Rejects (gm) |
|---|---|---|---|---|
| 2 | 49.99 | 49.36 | 16 | 1430 |
| 1 | 45.29 | 47.69 | 58 | 983 |
| 0 | 52.24 | 47.54 | 649 | 572 |
| 0.6 | 50.50 | 46.64 | 224 | 523 |

*Polymer concentration of the polymer solution is 20% by weight.

EXAMPLE 3

A) Polymerization of Copolymer ($P_3$).

The same process as in Example 1 was performed except that the compositions of (MF), (IF) and (RC) were as follows:

Monomer Feed (MF):

Behenyl alcohol ethoxylate (25 moles) methacrylic ester 1.26 grams

Methacrylic acid 0.63 grams

DI water 81.6 grams

DMDAAC 62% aqueous solution 109.41 grams

Acrylamide 62% aqueous solution 56.47 grams

Initiator Feed (IF):

0.216 gm Ammonium persulfate 60 gm water 1 drop 15% NaOH

Reactor Charge (RC):

0.032 gm Ammonium persulfate 250 gm water 0.0168 gm Versenex 80

The copolymer obtained was called ($P_3$).

B) Evaluation of resulting Polymer ($P_3$):

The same flotation process as in Example 1 was performed except that ($P_3$) was used instead of ($P_1$).

The following results were obtained and are gathered in Table 3 herein after:

| Polymer Solution Dose (gm)* | Top Brightness | Bottom Brightness | Filtrate Turbidity NTU | Rejects (gm) |
|---|---|---|---|---|
| 2 | 47.97 | 43.93 | 261 | 1430 |
| 2 | 47.93 | 43.47 | 307 | 1247 |
| 0 | 51.20 | 44.56 | 705 | 955 |
| 3 | 46.56 | 46.79 | 37 | 1148 |

*Polymer concentration of the polymer solution is 20% by weight.

In all cases (Tables 1–3) the copolymers ($P_1$), ($P_2$), and ($P_3$) were successful in reducing the filtrate turbidity of the flotation cell accepts with minimal impact on sheet brightness. In addition, the polymer provides an enhancement to the foaming observed in the flotation operation; in the case of Example 2 no surfactant was used, demonstrating the potential to reduce total chemical requirements. On the other hand, in the absence of copolymer ($P_2$) and ($P_3$) the filtrate turbidity is at a high level.

EXAMPLE 4

4 (a). Polymerization of a surface active DMDAAC/BEM/Acrylamide Copolymer ($P_4$).

A reactor comprising a 1 liter electrically heated resin flask with a four neck top was utilized. A condenser using tap water as the cooling medium was fitted to one neck; the agitator shaft entered through the central neck, sealed through a Teflon fitting and a O-ring lubricated with silicone grease; monomer was fed through a stainless steel tube inserted in a rubber stopper in the third neck; a temperature probe, initiator feed and $N_2$ were fed through tubing in a rubber stopper in the fourth neck. The condenser discharge was bubbled through water to maintain a positive pressure in the reactor.

Agitation was provided by a stainless steel 5.2 millimeter diameter Lightnin' high efficiency axial flow turbine set near the bottom of the flask, operating at 500 RPM. Temperature was controlled via a temperature sensor connected to a three mode controller using time-proportioning to modulate the electrical heating of the reactor. Monomer was fed into the reactor using a positive displacement pump over a two hour period. Initiator solution was fed into the reactor using a separate positive displacement pump over the same two hours period. Nitrogen was sparged into the reactor mass at a rate sufficient to maintain a positive pressure of about 1 Hg centimeter. For most reactions this corresponded to a flow rate of about 0.75 liter/min at 3 bars.

Initially, 0.16 gm ammonium persulfate, 0.026 gm Versenex 80 (40% diethylentriamine pentaacetic acid or DTPA solution) and 200 gm of deionized water were introduced into the reactor and thereafter the monomer feed and the initiator feed were introduced into the reactor.

The monomer feed (MF) had the following composition:

27.4 gm of monomer (BEM) having the formula:

110 gm of a 52.5% aqueous acrylamide solution, 23.9 gm of 62% aqueous solution of dimethyldiallylammonium chloride (DMDAAC), and 95.2 gm of deionized water and 13.7 gm of MAA (methacrylic acid).

The initiator feed (IF) had the following composition:

1.08 gm of ammonium persulfate, 60 ml of deionized water, and one drop of 15% aqueous NaOH (by weight).

The reaction was performed at pH about 7 and at a temperature of 90° C. The reaction mass was held at 90° C. after completion of feed of initiator and monomer for 30 minutes.

The copolymer ($P_4$) obtained had an estimated molecular weight of 50,000 daltons. Repulping a series of recycle paper was then performed.

4(b) Pulping step without ($P_4$).

The used paper starting product was a mixture of 3 month 50/50 ONP/ONG (old newspapers and old magazines) without any water based flexographic inked matters. The pulping machine was of the LAMORT 151 type with inward-flow.

- Mixture of 50/50 old paper: 1500 gm
- Sodium silicate solution: 111 gm (concentration: 33.8% in water molar ratio $SiO_2/Na_2O$: 3.3)
- Ethoxylated (11 EO) propoxylated (4 PO) alcohol $C_{16}$–$C_{20}$ (Rhoditek™ 1000): 2.25 gm
- Symperonic™ (Symperonic A7 from ICI, 7–9 EO $C_{12}$–$C_{16}$ alcohol): 0.18 gm
- Hydrogen Peroxide 30% aqueous solution: 50 g
- Controlled hard water ($3.10^{-3}$ mol/l $Ca^{2+}$ and $1.10^{-3}$ mol/l $Mg^{2+}$) at 45° C.: 10 liters The old Newspapers were charged into the pulper with all the other products. The pulping is done during 12 minutes at a speed rotation of about 2100 RPM. The pulp is then left to rest for 30 minutes. The resulting pulp was diluted with the controlled hard water defined above in order to obtain a 3% suspension of solid matter and a pH brought back from between 8 and 9. To this suspension was added 0.05% of ($P_4$) (based on the weight of pulp).

4(c). Flotation Step

The pulp obtained above was further diluted with controlled hard water in order to obtain a 1% solid matter suspension, and the pH was adjusted to 9. The flotation step is carried out in a flotation cell of LAMORT 151 type. The air injection valve is opened and the flotation process was done during 12 minutes. After having rejected the foam, the pulp was then filtered on a Buchner funnel. The slurry obtained is then dried and its brightness was measured according to standard N F Q 03–039. The brightness obtained was 63.

COMPARATIVE EXAMPLE 5

The flotation process of Example 4(b) and the flotation process of Example 4(c) were again performed except that copolymer ($P_4$) was not added during the pulping. The brightness obtained was 61. From Examples 4 and comparative Example 5, it was apparent that the addition of the polymer of the invention significantly enhanced the brightness of the final pulp.

What is claimed is:

1. A process for deinking wastepaper comprising the steps of:
   (1) converting wastepaper to a pulp,
   (2) contacting the pulp in an aqueous medium having a pH from about 4 to about 10.5 with a deinking agent comprising an aqueous dispersion of a surface active copolymer of:
   (A) from about 0.1–95 weight percent based on total weight monomers of at least one vinyl monomer having at least one quarternized nitrogen atom;
   (B) from about 0–95, weight percent based on the total weight of the monomers, of at least one vinyl monomer having at least one amide group;
   (C) from about 0.5–75, weight percent based on the total weight of the monomers, of at least one vinyl monomer of the formula:

$H_2C=C(R_6)-C(O)-O-[CH_2CH(R_7)O]_m-(CH_2CH_2O)_n-R_8$ in which $R_6$ is H or $C_1$–$C_6$ alkyl group; $R_7$ is $C_1$–$C_4$ alkyl; n is an average number from about 6–100 and m is an average number from about 0–50 provided that n is greater or equal to m and the sum of (n+m) is about 6–100, $R_8$ is a hydrophobic $C_8$–$C_{40}$ linear or branched alkyl, alkylaryl, or arylalkyl group;
   (D) from about 0–10 weight percent based on the total weight of the monomers, of at least one vinyl monomer bearing at least one carboxylic group; and
   (3) removing ink from the pulp; with the proviso that the sum of the weight percentages of monomers (A)–(D) is 100.

2. The process for deinking wastepaper of claim 1 wherein monomer (D) is of the formula:

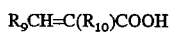

$R_9CH=C(R_{10})COOH$ in which $R_9$ is H and $R_{10}$ is H, $C_1$–$C_4$ alkyl, or $CH_2$ COOY; $R_9$ is COOY, and R10 is H or $CH_2COOY$; or $R_9$ is $CH_3$ and $R_{10}$ is H and Y is H or $C_1$–$C_4$ alkyl.

3. The process for deinking of claim 1 wherein monomer (A) is of the formula:

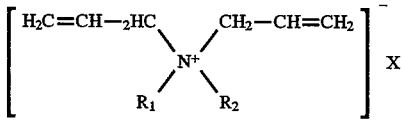

in which $R_1$ and $R_2$, are identical or different and are $C_1$–$C_6$ alkyl, and X' is a mineral and/or organic anion.

4. The process for deinking of claim 3, wherein monomer (A) is dimethyldiallylammonium chloride or sulfate.

5. The process for deinking of claim 3, wherein monomer (A) is diethyldiallylammonium chloride or sulfate.

6. The process for deinking of claim 1, wherein monomer (A) is selected from the group consisting of: (meth) acryloyloxyethyltrialkylammonium (chloride or methylsulfate), (meth) acryloyloxyhydroxypropyltrialkylammonium (chloride or methylsulfate), and (meth) acrylamidopropyltrialkylammonium (chloride or methylsulfate).

7. The process for deinking of claim 1, wherein monomer (B) is in the form of a precursor selected from the group consisting of:
   - vinyl pyridine or vinyl amines,
   - vinyl amides which can be subsequently quarternized with methyl chloride, benzyl chloride or dimethyl sulfate,
   - (meth)acrylic acid modified with glycidyltrialkylammonium chloride,
   - hydrolyzed vinyl formamide, and the inorganic salt or quarternized derivatives thereof.

8. The process for deinking of claim 1, wherein monomer (B) is of the formula:

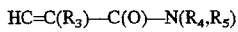

in which $R_3$ is H or $C_1$–$C_6$ alkyl, $R_4$ and $R_5$ identical or different and are H or $C_1$–$C_{12}$ hydrocarbon radicals.

9. The process for deinking of claim 1, wherein monomer (C) is of the formula:

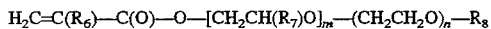

in which $R_6$ is H or methyl; $R_7$ is methyl; n is an average number from about 10–40 and m is an average number from about 0–10; and $R_8$ is an hydrophobic $C_8$–$C_{40}$ linear or branched alkyl, alkylaryl or arylalkyl group.

10. The process for deinking of claim 9, wherein $R_8$ is a $C_{18}$–$C_{30}$ alkyl radical.

11. The process for deinking of claim 9, wherein $R_8$ is a behenyl radical.

12. The process for deinking claim 9, wherein $R_8$ is the formula:

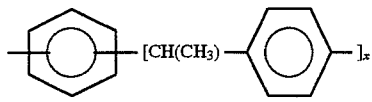

x is an average number of from about 2 to about 3, wherein the substituent denoted x is randomly distributed around the benzene ring to which it is linked.

13. The process for deinking of claim 1, wherein monomer (D) is of the formula:

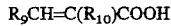

in which $R_9$ is H, C(O)OY or $CH_3$, wherein when $R_9$ is H, Rio is H, $C_1$–$C_4$ alkyl, or $CH_2$ COOY; when $R_9$ is COOY, $R_{10}$ is H or $CH_2COOY$; or when $R_9$ is $CH_3$, Rio is H, Y is H or $C_1$–$C_4$ alkyl.

14. The process for deinking of claim 1, wherein the amount of surface active copolymer (calculated as dry) ranges from about 0.01 to about 5.0 percent by weight based upon the dry weight of all wastepaper.

15. The process for deinking of claim 1, wherein monomer (D) is acrylic or methacrylic acid or a mixture thereof with itaconic or fumaric acid.

16. The process for deinking of claim 1, wherein the molecular weight of said surface active polymer is between 5,000 and 5,000,000 daltons.

17. The process for deinking of claim 1 wherein the ink is removed from the pulp by flotation, water washing or a combination of flotation and water washing.

18. The process according to claim 1 wherein the pH of said aqueous medium of step (2) is between about 4 to about 8.

19. The process according to claim 1 wherein the pH of said aqueous medium of step (2) is between about 8 to about 10.5.

20. The process according to claim 19 wherein the paper contains more than about 50% of oil-based inks.

21. The process according to claim 1 wherein said aqueous medium further comprises one or more nonionic surfactants selected from the group consisting of 1) a fatty alcohol having a carbon number of from about 8 to about 22, alkoxylated with ethylene oxide and propylene oxide, as represented by formula (I)

wherein $R_{11}$ is a straight-chain or branched alkyl group having a carbon number of from about 8 to 22; $Z_1$ is H or Cl; x represents the number of oxyethylene groups per molecule and is in the range of from about 3 to about 25; and y represents the number of oxypropylene groups per molecule and is in the range of from about 1 to about 10;

2) a fatty alcohol having a carbon number of from about 8 to about 22, alkoxylated with ethylene oxide and propylene oxide, as represented by formula (II):

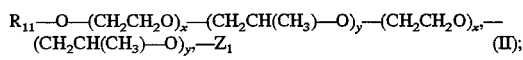

wherein $R_{11}$ is a straight-chain or branched alkyl group having a carbon number of from about 8 to about 22; $Z_1$ is H or Cl; x and x', which may be the same or different, represents the number of oxyethylene groups per molecule and is in the range of from about 2 to about 25; and y and y', which may be the same or different represents the number of oxypropylene groups per molecule and is in the range of from 0 to about 10;

3) a fatty acid having a carbon number of from about 8 to about 22, alkoxylated with ethylene oxide and propylene oxide, as represented by formula (III):

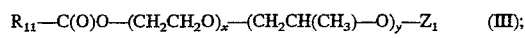

wherein $R_{11}$ is a straight-chain or branched alkyl group having a carbon number of from about 8 to about 22; $Z_1$ is H or Cl; x represents the number of oxyethylene groups per molecule and is in the range of from about 3 to about 25; and y represents the number of oxypropylene groups per molecule and is in the range of from about 2 to about 15;

4) an aromatic alcohol such as phenol having alkyl chain(s) with a carbon number of from about 8 to about 20, alkoxylated with ethylene oxide, as represented by formula (IV):

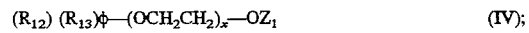

wherein φ is a phenyl ring, $R_{12}$ and $R_{13}$ independently are H or an alkyl group which is branched or straight-chain having a carbon number of from about 8 to about 14; $Z_1$ is H or Cl; and x is the number of oxyethylene groups per molecule and is in the range of from about 1 to about 20;

5) fatty amide of alkanolamide of formula (V):

wherein R' and R" may be the same or different and are H or $CH_2CH_2OH$ or $CH_2CH(CH_3)$—OH and $R_{11}$ is a fatty alkyl group having a carbon number of from about 8 to about 20;

6) an alkoxylated fatty acid amide of alkanolamide of formula (VI):

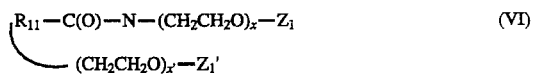

wherein $R_{11}$ is a fatty alkyl group having a carbon number of from about 8 to about 20; $Z_1$ and $Z_1'$, which may be the same or different are H or Cl; and x and x', which may be the same or different, represents the number of oxyethylene groups per molecule and is in the range of from about 2 to about 10;

7) a propylene glycol alkoxylate of formula (VII):

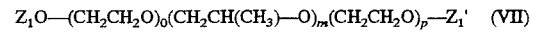

wherein $Z_1$ and $Z_1'$, which may be the same or different are H or Cl; o and p are the number of oxyethylene groups per molecule and are in the range of from about 3 to about 15 and m is the number of oxypropylene groups per molecule and is in the range of from about 5 to about 40;

8) a block or random copolymer of ethylene and propylene oxide of formula (VIII):

$$Z_1O(CH(CH_3)CH_2O)_m(CH_2CH_2O)_p(CH(CH_3)CH_2O)_nZ_1' \qquad \text{(VIII)}$$

wherein $Z_1$ and $Z_1'$, which may be the same or different are H or Cl; m and n are the number of oxypropylene groups per molecule and are in the range of from about 10 to about 25 and p is the number of oxyethylene groups per molecule and is in the range of from about 5 to about 25;

9) an ethoxylated fatty acid glycol and/or polyethylene glycol esters of formula (IX):

$$R_{15}-C(O)O-(CH_2CH_2O)_x-R_{16} \qquad \text{(IX)}$$

wherein $R_{15}$ is a fatty alkyl group of greater than $C_8$; $R_{16}$ is alkyl of greater than $C_8$ or H; and x represents the number of oxyethylene groups per molecule and is in the range of from about 5 to about 200; and 10) an ethoxylated fatty alcohol of formula (X):

$$R_{15}O(CH_2CH_2O)_x-Z_1 \qquad \text{(X)}$$

wherein $R_{15}$ is a fatty alkyl group; $Z_1$ is H or Cl; and x represents the number of oxyethylene groups per molecule and is in the range of from about 1 to about 20.

22. The process according to claim 21 wherein said nonionic surfactant is present in step (2) in an amount of about 0.01 to about 3.0 percent by weight of the dry weight of all paper stock in step (1).

23. The process according to claim 1, wherein said steps (1) and (2) are performed at the same time.

* * * * *